INVENTOR
William S. King
BY R. S. Berry
ATTORNEY

United States Patent Office 3,226,052
Patented Dec. 28, 1965

3,226,052
FISHING REEL
William S. King, 6532 Day St., Tujunga, Calif.
Filed Apr. 22, 1963, Ser. No. 274,495
2 Claims. (Cl. 242—84.54)

This invention relates to a fishing reel of the type set forth in my co-pending application Serial Number 202,748 filed June 15, 1962 and also in an abandoned application Serial Number 70,725 filed Nov. 21, 1960 on a Combined Free Spool and Free Line Fishing Reel and of which Application 70,725 this application is a continuation-in-part.

In fishing reels of the above character, the line bearing spool is adapted to be disposed in either of two positions relative to the rod on which the spool is carried; the spool being arranged with its axis extending longitudinally of the rod in effecting spin casting and free spool or free line fishing operations, or with the spool disposed with its axis extending transversely of the rod in effecting free wheel casting and a line rewinding or retrieving operation.

The invention has as its primary object the provision of a fishing reel wherein the line spool thereof is normally disposed with its axis extending transversely of a rod, for free rotation in a direction to unwind the line therefrom and is adapted to be conditioned through a positive clutch and a friction mechanism for manual rotation in a direction to effect winding of the line thereon in a conventional manner and wherein the spool is adapted to also be positioned with its axis extending longitudinally of a rod for spin casting and for free line fishing wherein the line unwinds from an end of the spool by employment of a spool mounting such as is set forth in Patent No. 3,053,469 issued to me Sept. 11, 1962 and wherein the spool may be held against rotation while in the free line position and released for free rotation during transition to its free spool position so as not to materially resist the pull of a hooked fish, and the reel then conditioned at the will of the angler for rewinding operation.

Heretofore a type of fishing reel has been produced wherein the spool thereof is adapted for a free spool unwinding turning movement in one direction and also adapted for winding a line thereon in the opposite direction; and fishing reels have also been produced of a type wherein the spool is adapted to be disposed in either an end free line unwinding position or disposed in a line rewinding position. The present invention is characterized by the embodiment of both of said types in a single reel which not only gives the angler a wider range of choice in fishing operation but enables the attainment of greater efficiency in free line fishing than is ordinarily accomplished with a free line spool not associated with a free spool and its rewinding arrangement.

In combining the free spool and the free line type of reels this feature of the invention is carried out by the employment of a single spool equipped with manually operable rewinding mechanism and as a result, when fishing with the free line setting of the spool, it is necessary, in order to condition the spool for the rewinding operation to first dispose the spool in its free spool condition where, as in the ordinary free spool type of reel, certain resistances to unwinding of the fishing line are developed which would generally be objectionable in the transition from the free line arrangement of the spool to its rewinding condition.

A particular object of this invention in addition to combining the free line and free spool features, is to provide a construction whereby resistance to unwinding of the line in the free line arrangement will be reduced to a minimum in conditioning the spool for rewinding, particularly when the line is being pulled by a fish.

Another object is to provide a reel of the above character embodying a manually controlled positive clutch together with a friction clutch for placing the line spool of the reel in and out of operative connection with the manually operable crank employed in rotating the spool in its line winding direction, wherein immediate or substantially immediate positive yet cushioned inter-engagement of the clutch elements is effected on actuating the manual control and whereby such inter-engagement is effected with a minimum of jar so as to minimize resultant resistance to the line being pulled when conditioning the spool for winding the line thereon following a free line fishing operation.

Another object is to provide the reel with manually controlled means for frictionally retarding rotation of the line spool in a spin-casting operation to thereby maintain a line taut while unwinding from the spool so as to minimize tangling and kinking of the line in flight.

Another object and an important feature of the invention, constituting an innovation in the sport of fishing, resides in the provision of a construction whereby the line spool may be removed and replaced relative to the reel so that the latter may be easily equipped with spools carrying various grades of lines to meet various requirements, and wherein such interchange of line spools may be effected without the use of implements or tools.

Another object is to provide a reel of the above character wherein, while a fish is running with a free line, the spool may be turned from its longitudinal free line position to its transverse free spool position to a reeling in position without setting up unwanted resistance to the line being advanced by the pull of the fish.

In producing the invention, consideration has been given to the fact that some species of fish are extremely wary in swallowing a baited hook, particularly where any appreciable resistance is offered to movement of the baited hook as where the fish mouths the bait while speedily advancing as in the case of yellow-tail, bonito tuna and others of the mackerel family, which feed in rapidly moving schools. Such fish are characterized by their habit of holding the catch in their mouths for a short period before swallowing, and it has been observed that a light pull on the baited hook opposing the fish results in the fish either stripping the bait from the hook and ejecting the latter, or results in the fish spitting out the bait and hook, thereby escaping capture. By the provision of a construction in a fishing reel whereby the feed of the unwinding line from the spool when pulled by a running fish will offer little or no resistance to such pull particularly when shifting the spool to its intermediate free spool position preliminary to applying the spool controlling positive clutch, the possibility of the baited hook being swallowed by the fish with a resultant "catch" is greatly enhanced.

With the foregoing objects and purpose in view, together with such other objects and advantages as may subsequently appear, the invention resides in the parts and in the construction, arrangement and combination of parts shown by way of example in the accompanying drawings, in which.

Figure 1:
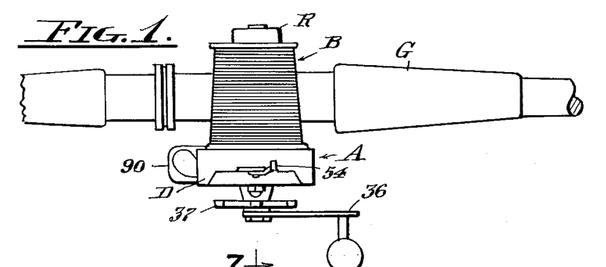
FIG. 1 is a plan view of a fishing rod and reel equipped with the invention showing the reel in its line retrieving position in which the line spool is disposed with its longitudinal axis extending transversely of the rod.
Figures 2, 3:
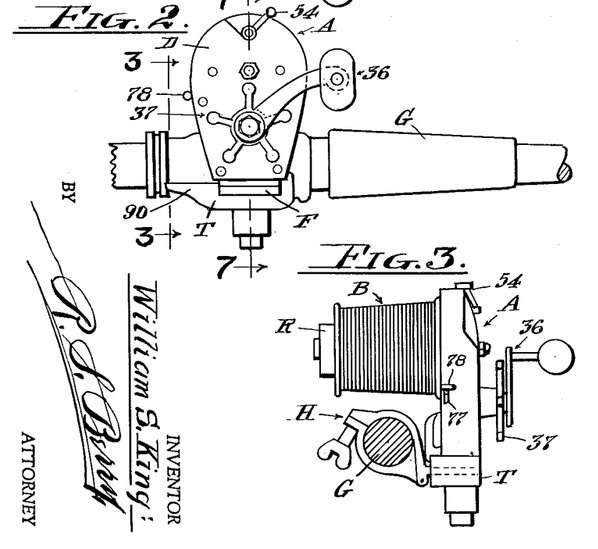
FIG. 2 is a view in side elevation of the structure shown in FIG. 1.
FIG. 3 is a section and elevation as seen on the line 3—3 of FIG. 2 in the direction indicated by the arrows.
Figure 4:
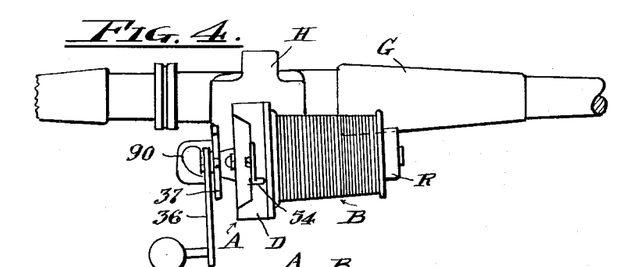
FIG. 4 is a plan view showing the spool in its free line fishing position wherein the spool is arranged with its longitudinal axis extending lengthwise of the rod.
Figure 5:
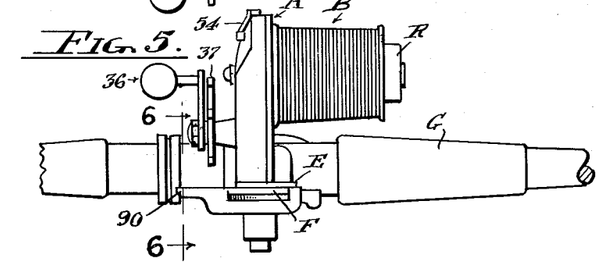
FIG. 5 is a view in side elevation of the structure shown in FIG. 4.
Figure 6:
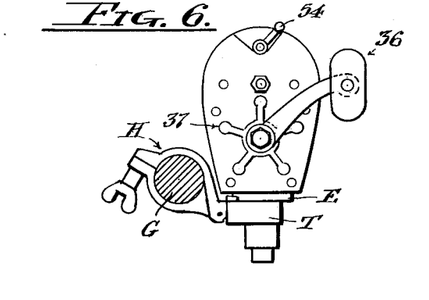
FIG. 6 is a cross-section and end view as seen on the line 6—6 of FIG. 5 in the direction indicated by the arrows.

Referring to the drawings more specifically A indicates generally a fishing reel constructed in accordance with the present invention, B designates a line receiving spool embodied in the reel A, and C indicates a spindle on which the spool B is revolubly mounted. A housing D on which the spindle C is carried has a base E supported and turnably seated on a reel support F adapted to be detachably mounted on a fishing rod or pole G by means of a rod engaging clamp H; the base E being connected to the support F by a pivot pin J whereby the reel may be swung horizontally between a position wherein the axis of the spool B extends transversely of the rod thereabove, as shown in FIGS. 1, 2 and 3 and a position wherein the axis of the spool B extends longitudinally of the rod, above and to one side thereof as shown in FIGS. 4, 5 and 6. When extended transversely of the rod, the spool is adapted to be employed as free wheeling both in casting and fishing operations and to be manually driven in winding or reeling in operations, and and when extended longitudinally of the rod is employed in spin casting and free line fishing operations.

In the arrangement shown, the reel A is pivotally mounted in laterally off-set relation to the rod G with the support F disposed on a plane extending below the underside of the rod so that the spool will be disposed close to the rod, whereby in spin casting, rod whip by the line unwinding from the spool will be eliminated and when the spool is turned to its rewinding position transversely of the rod, guiding of the line onto the spool during rewinding is facilitated.

Figures 7, 8, 9, 10, 11:
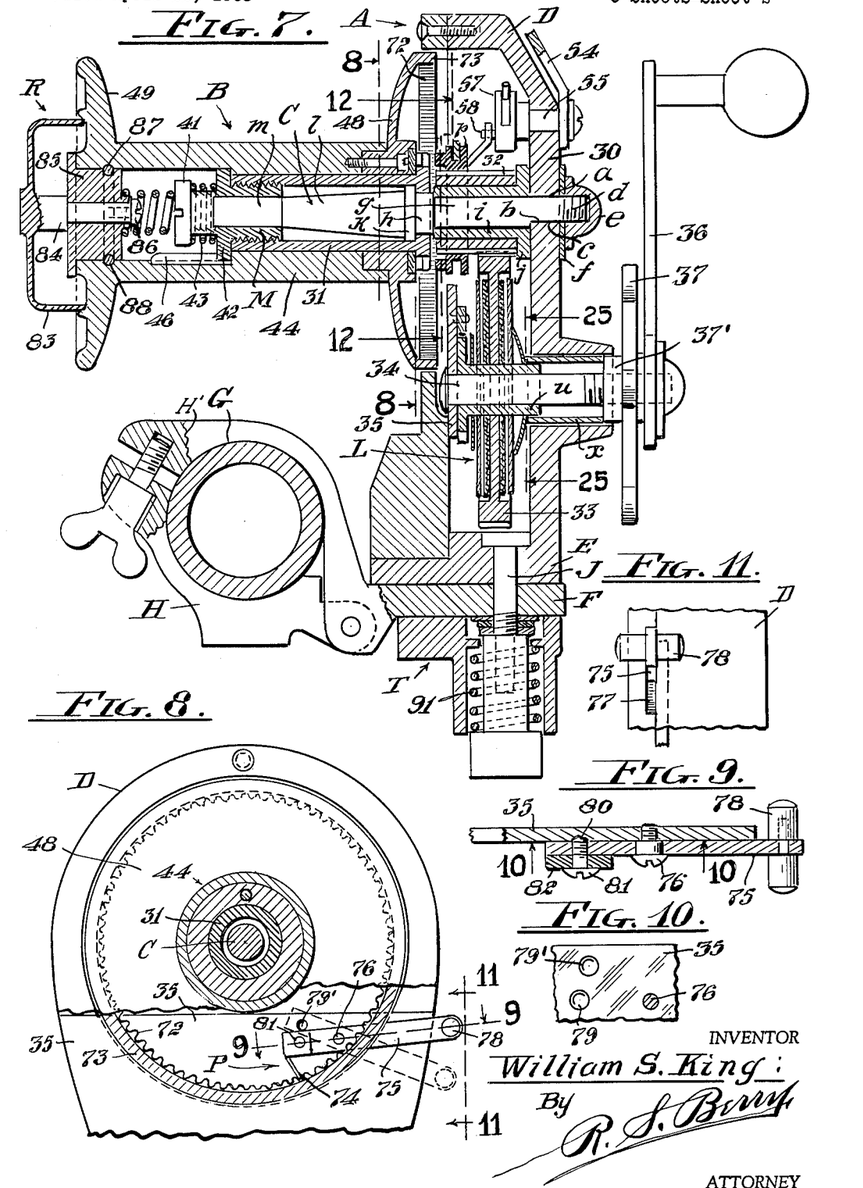
FIG. 7 is an enlarged view in section and elevation as seen on the line 7—7 of FIG. 2 in the direction indicated by the arrows, showing the line spool in the line retrieving position and as being free spool with the positive clutch and friction clutch elements in their disengaged positions.
FIG. 8 is a view in section and elevation taken on the line 8—8 of FIG. 7 showing the brake for retarding free rotation of the line spool.
FIG. 9 is an enlarged longitudinal sectional view of the brake as seen on the line 9—9 of FIG. 8.
FIG. 10 is a detail in elevation as seen on the line 10—10 of FIG. 9.
FIG. 11 is a detail in end elevation as seen on the line 11—11 of FIG. 8.

To accomplish the above arrangement, the support F is in the form of a flat plate which projects from the lower end of an upwardly projecting rod engaging member H' of the clamp H the upper end of which member is adapted to overlie the rod G so that when the rod is horizontally disposed the member H' will depend alongside thereof, as particularly shown in FIG. 7. When the reel is in its free spool position shown in FIG. 7 the spool will extend in longitudinal overlying relation to the member H' of the rod clamp H, and when disposed in its free line position, the spool will extend longitudinally in upwardly spaced outwardly projecting transverse relation to the support F.

The spindle C is fixedly mounted at one end thereof on an upright end plate 30 of the housing D to project horizontally therefrom, the spindle C having such end portion extending through an aperture $a$ in the plate 30. The portion of the spindle extending through the plate 30 has a flat side face $b$ which is seated on a corresponding flat face $c$ on the portion of the plate 30 surrounding the aperture $a$ whereby the spindle is held against rotation in its mounting. The contiguous end of the spindle has screw threads $d$ on which is screwed a nut $e$ to bear against a washer $f$ seated against the end plate 30. The end portion $g$ of the spindle C extending from the plate 30 is cylindrical and leads to an enlarged bearing portion $h$. Surrounding the cylindrical end portion $g$ of the spindle and conforming thereto is a fixed sleeve $i$ having an end flange $j$ which abuts the inner face on the end plate 30. The opposite end of the sleeve $i$ abuts the bearing portion $h$. Tightening of the nut $e$ on the threaded end $d$ of the spindle C draws the cylindrical end portion $g$ of the spindle into tight abutting engagement with the ends of the sleeve $i$ so as to tightly clamp the flanged end $j$ of the sleeve against the end plate 30.

A peripheral flange $k$ is provided intermediate the ends of the spindle C in spaced relation to the outer margin of the bearing portion $h$ from which flange the intermediate portion $l$ of the spindle converges to a cylindrical end bearing portion $m$.

Revolubly encompassing the intermediate portion $l$ of the spindle C and loosely overlying the flange $k$ is a sleeve 31 having an inturned flange $n$ on one end thereof the inner periphery of which slidably abuts the cylindrical bearing portion $h$ of the spindle C and one face of which is adapted to slidably abut the adjacent end face of the flange $k$ but is normally spaced therefrom. The sleeve 31 has an out-turned flange $o$ on the end thereof carrying the inturned flange $n$ which flange $o$ constitutes the driven member of a positive clutch K the drive member of which embodies a ring $p$ slidable on and engaged by the teeth of a spur gear 32 revolubly mounted on the fixed sleeve $i$ and meshed with a driving gear wheel 33.

Figures 12, 13:
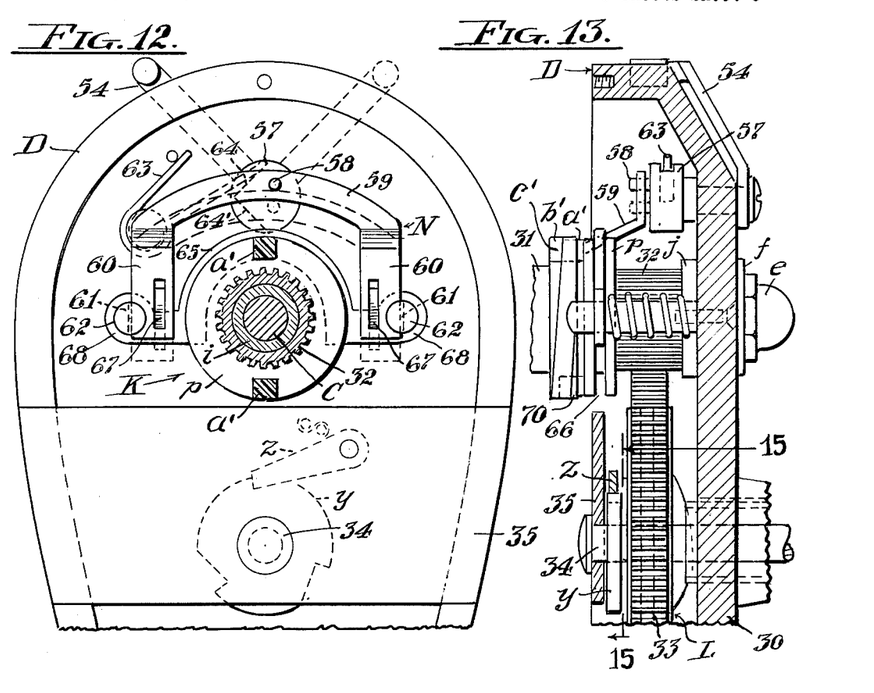
FIG. 12 is an enlarged view in section and elevation as seen on the line 12—12 of FIG. 7 showing the positive clutch operating control mechanism.
FIG. 13 is a view in side elevation partly in section of the structure shown in FIG. 12.

The ring member $p$ of the clutch K, as particularly shown in FIG. 12, has a pair of rectangular teeth a' projecting diametrically from the end thereof presented to the clutch driven member o which teeth a' are adapted to be moved in and out of engagement with slots b' in the member o so as to place the spur gear 32 and its driving mechanism in and out of operative engagement with the sleeve 31.

Figures 24, 25, 26:
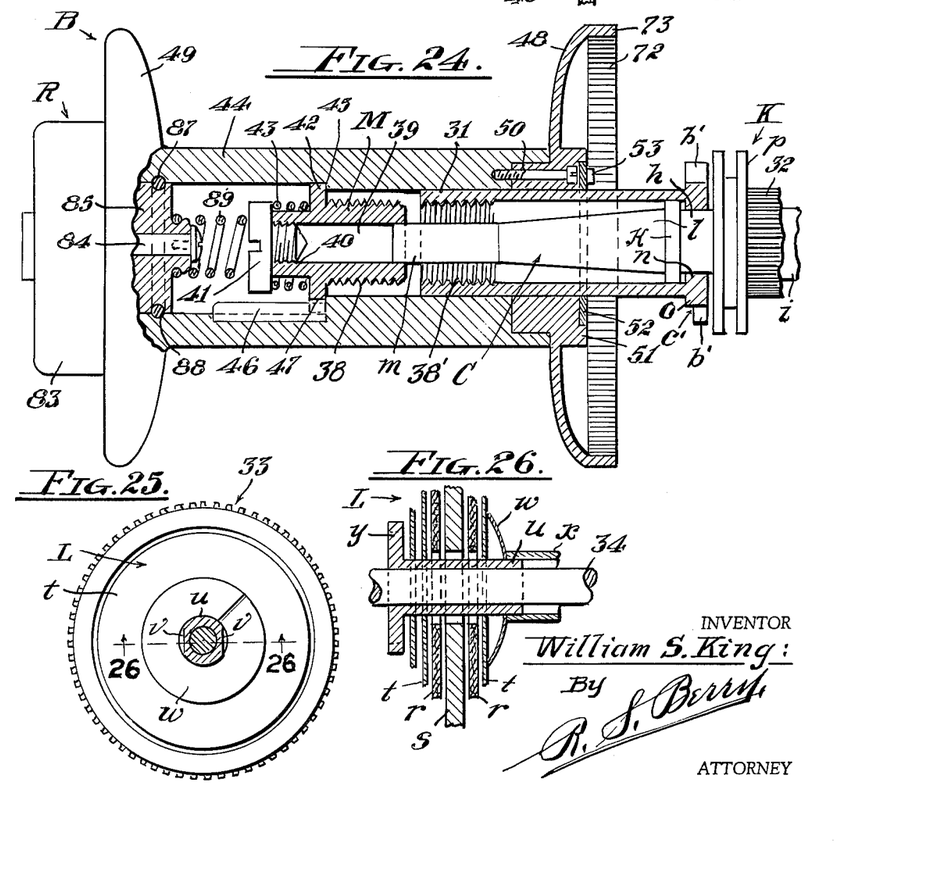
FIG. 24 is a fragmentary view in section and elevation similar to FIG. 17 showing the line spool in partly detached position relative to the reel mechanism.
FIG. 25 is a detail in section and elevation of the friction clutch element as seen on the line 25—25 of FIG. 7.
FIG. 26 is an enlarged detail in section taken on the line 26—26 of FIG. 25 showing the members of the friction clutch element in their relatively disengaged position.

A conventional friction clutch L is arranged interiorly of the gear wheel 33 for engagement therewith which clutch includes a pair of fibrous disks r—r arranged on opposite sides of the web s of the gear wheel 33, and a pair of metallic disks t—t adjacent the outer faces of the fibrous disks as shown in FIG. 26. The gear wheel 33 and the clutch disks r—r and t—t are carried on a sleeve u fixed on a revoluble shaft 34.

The gear wheel and the fibrous disks are free on the sleeve u while the metallic discs t—t are engaged with the sleeve u to rotate therewith; the sleeve u having opposed flat faces v which slidably abut corresponding faces on the margins of openings in the disks t—t through which the sleeve u extends.

The shaft 34 is revolubly supported at its inner end on an upstanding plate 35 extending between and carried by the side walls of the housing D in spaced relation to the end plate 30; the outer end of the shaft 34 extending through the end plate 30 and revolubly supported thereby. Fixed on the free end of the shaft 34 is a crank 36 by which the shaft and the sleeve u thereon may be manually rotated, in a well known manner. The clutch L is adapted to be placed in and out of operative driving connection between the sleeve u and gear wheel 33 by a conventional star-wheel 37 on a collar 37' threaded on the shaft 34 for movement longitudinally thereof. The collar 37' is revolubly supported in a bearing 37" on the end plate 30 thereby revolubly supporting the adjacent end of the shaft 34.

A bowed plate spring w surrounding the sleeve u bears against the outermost disk t of the clutch L and interposed between the spring w and the hub 37' of the star-wheel 37 is a spacing sleeve x as is common in friction clutch mechanism of the recited type.

Figure 15:
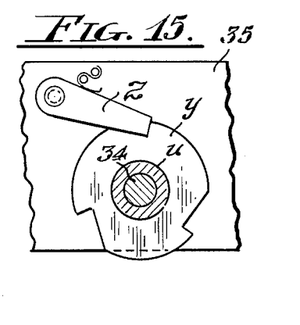
FIG. 15 is a view in section and elevation taken on the line 15—15 of FIG. 13 showing an anti-reverse ratchet.

Means are provided in a usual manner for limiting rotation of the sleeve u to one direction, such means comprising a ratchet wheel y fixed on the sleeve u which wheel is engaged by a spring pressed pawl z pivoted on the plate 35, as shown in FIG. 15.

By arranging the reel support F in offset laterally projecting relation to the rod G, as before described, the driving gear wheel 33 and friction clutch L may be of diameters greatly exceeding the dimensions of such elements as commonly employed in fishing reel constructions, and without excessive spacing of the spool B relative to the rod G as would be the case were the driving gear wheel 33 and star wheel controlled clutch L here shown positioned wholly above the rod on which the reel is mounted as usually practiced.

Engageable with the outer end of the sleeve 31 is a tubular coupling M having an inner end portion formed with external lefthand threads 38 adapted to be screwed into engagement with complementary internal threads 38' interiorly of the sleeve 31 as shown in FIG. 24 the coupling M also having an axial bore 39 into which the cylindrical bearing end m of the spindle C is positionable in sliding contact with the coupling M whereby the coupling will serve as a bearing for the outer end of the revoluble sleeve 31 on the fixed spindle C. The coupling M further embodies an internally threaded end portion 40 in which is threaded an adjustment screw 41 having its inner end abutting the contiguous end of the spindle C. The screw 41 serves as a means for adjusting the sleeve 31 longitudinally of the spindle C whereby the flange n on the inner end of the sleeve 31 may be brought into proper sliding contact with the flange k on the spindle C to minimize friction between the flanges n and k.

The coupling M has a flange 42 between which and the head of the screw 41 is a coiled thrust spring 43 which acts to hold the screw 41 against loosening.

Encompassing the sleeve 31 with a close fit is the tubular hub 44 of the line spool B, which hub has an internal shoulder 45 against which the inner face of the flange 42 is adapted to abut in spaced relation to the outer end of the sleeve 31. The flange 42 is engaged with the spool hub 44 by a spline 46 affixed to and extending longitudinally of the hub 44 interiorly thereof, the flange 42 having a channel 47 slidably engaging the spline 46. The coupling M is thus held against rotation relative to the spool. In assembling the spool B on the sleeve 31, the threaded engagement of the coupling M with the outer end of the sleeve 31 is effected by rotating the spool B counter-clockwise relative to the sleeve 11 as viewed from the outer end of the spool B with the left hand threads of the coupling M inter-engaged with the threaded end of the sleeve 31, which is accomplished after mounting the spindle C in the reel housing D. In thus interconnecting the spool B and sleeve 31 the flange 42 on the coupling M is brought into its seated position on the shoulder 45 of the spool so that as the coupling advances in the sleeve 31, the spool is advanced longitudinally of the sleeve until the inner end of the spool abuts the flange o on the sleeve 31 which flange o then acts to limit advance of the spool on the sleeve and also to limit turning movement of the spool relative to the sleeve in the direction of movement effected in screwing the coupling M into engagement with the sleeve.

Previous to mounting the spool on the spindle the sleeves 31 and i together with the gear 32 and clutch K are assembled on the spindle C before mounting the latter on the plate 30, after which a yoke, later described, for operating the clutch K is put in place.

The spool B has inner and outer end flanges 48 and 49 respectively of which the outer end flange 49 is formed integral with the hub 44 while the inner end flange 48 is detachably connected to the inner end of the hub 44 by suitably spaced screws 50, one only of which is shown. The inner flange 48 has a hub 51 on which is mounted a hardened steel ring 52 which is adapted to abut the adjacent face of the flange o, the ring 52 being brought into such position on assembling the spool B on the sleeve 41 as above stated.

In order to facilitate initial assemblage of the spool B on the reel A as will be later described, the ring 52 is counter-sunk in a recess in the end face of the hub 51 surrounded by an annular side wall with the margin of the ring frictionally engaged with the side wall of the recess to firmly hold the ring in place yet permit turning and adjustment of the ring circumferentially relative to the spool as need be.

As a means for preventing excessively tight abutting contact of the ring 52 and flange o under the wedge action of the threaded connection between the spool and sleeve, such as would be apt to render difficult the separation of the assembled spool and sleeve, means are provided for limiting counter-clockwise rotation of the spool relative to the sleeve in effecting the screw connection between the spool and sleeve afforded by the coupling M. This means comprises a rectangular lug 53 projecting from the ring 52 arranged to be brought into engagement with one of the slots b' in the flange o as particularly shown in FIG. 23. Preventing of binding of the spool against the flange o enables quick interchange of spools when such is desired, as later described.

In order to permit ready movement of the lug 53 into a slot b' as the spool advances toward the flange o on the threads 38–38' the flange o has a side recess c' leading to the slot b' to be engaged by the lug 53, the recess c' being on the side of the flange o presented to the spool B and opening to the slot b' on the side thereof approached by the advancing lug 53.

Movement of the clutch teeth a' on the ring p in and out of engagement with the slots b' in the flange o is effected in a usual manner by the manual operation of a lever 54 attached to a rock-shaft 55 leading from the lever 54 through an upper portion of the end plate 30 of the housing D, which rock-shaft 55 is fitted interiorly of the housing D with an end disk 57 having a wrist pin 58 pivotally connected to the connecting member 59 of a yoke N the side members 60—60 of which extend astride the clutch K and are slidably engaged in guide grooves 61 in posts 62 carried on the housing and plate 30 whereby on rocking the shaft 55 the yoke M may be moved up or down.

A thrust leaf spring 63 bears on either of oppositely inclined flat faces 64–64' on the upper peripheral portion of the disk 57 to hold the disk stationary with the yoke N disposed in either its upper or its lower position. Vertical movement of the side members 60—60 of the yoke N effects lateral horizontal movement of a semicircular bar 65 extending longitudinally into a peripheral groove 66 in the clutch ring p so as to advance or retract the latter in a usual fashion, the side members 60—60 of the yoke N having inclined tongues 67—67 the undersides of which abut the upper margins of outwardly extending end portions of the bar 65 so as to retract the bar on downward movement of the yoke N. The end portions of the bar 65 terminate in rings 68—68 which slidably encompass the posts 62 whereby the bar 65 is guided in and confined to its movement, and wound on the posts 62 are thrust springs 69—69 which bear against the end rings 68—68 of the bar 65 to advance the latter and thereby advance the clutch ring p to its engaged position when the yoke N is moved to its uppermost position.

Figures 14, 16:
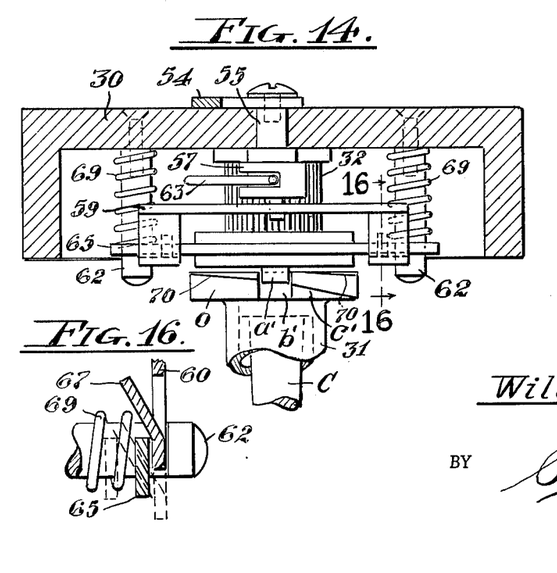
FIG. 14 is a plan view and partial section of the structure shown in FIG. 12.
FIG. 16 is a detail in section and elevation taken on the line 16—16 of FIG. 14 as seen in the direction indicated by the arrows.
Figure 23:
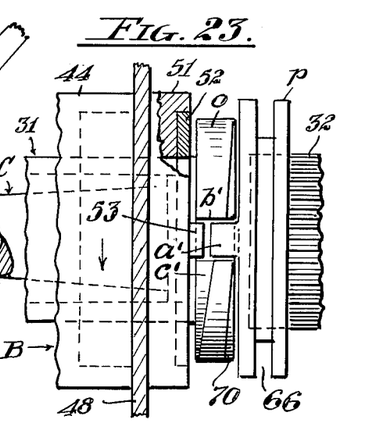
FIG. 23 is a greatly enlarged detail in plan partly in section with portions broken away as seen on the line 23—23 of FIG. 17, depicting the positive clutch in driving connection with the spool and indicating the mode of detachably inter-connecting the line spool therewith.

On advancing the clutch ring p to engage the clutch K, that is, from the position shown in FIG. 7 to the position shown in FIG. 23, the teeth a unless then disposed directly opposite the slot b will be caused to abut the adjacent face of the flange o until the ring p is advanced sufficiently to permit the teeth a' to enter the slots b'. In order to relieve the inclined tongues 67—67 of undue strains imposed thereon by thrusts of the springs 69 when advance of the bar 65 and ring p is opposed by the abutting of the teeth a' against the flange o, the face of the flange o presented to the teeth a' is inclined inwardly adjacent its margin counter-clockwise from one side of each of the slots b' to near the opposite side of the other slots b' as indicated at 70 in FIG. 14, whereby the teeth a' in approaching the slots b' will traverse the incline 70 until they enter the slots. This construction insures at least almost immediate positive inter-engagement of the clutch elements on actuation of the clutch control lever 54 thus preventing slipping or missing of inter-engagement of the clutch elements a'–b' as might otherwise possibly occur where the spool is being revolved in its free spool position by the pull on the line of a speedily running fish.

As a means for cushioning impact on the clutch teeth a' when brought into engagement with the flange o, the clutch ring p and the teeth a' are unitarily formed of resilient material such as rubber or rubber like composition or other suitable plastic.

The recited construction and assemblage of the spool B affords ready equipment of the reel with a readily controlled braking or retarding mechanism P here shown as embodying serrations 72 projecting from the inner periphery of an outwardly projecting rim 73 on the end flange 48 of the spool B, with which serrations a flexible tongue 74 is engageable; the tongue being mounted on an end of a rocker-arm 75 carried on a pivot 76 fixed on the housing plate 35 as particularly shown in FIGS. 8–11. The other end of the arm 75 extends through a slot 77 in a side wall of the housing D as shown in FIG. 11 and has a handle 78 thereon by which the arm 75 may be rocked to dispose the tongue 74 in or out of sliding engagement with the serrations 72. As a means for releasably holding the arm 75 against free movement in either the serration engaged or disengaged position, the plate 35 is provided with a pair of concave indents 79–79' spaced apart on an arc concentric with the pivot 76 as shown in FIG. 10, and the arm 75 has a projection 80 on its inner face forming a detent which is adapted to be engaged with either of the indents 79–79'. The projection 80 is here shown as comprising the outer end of the threaded shank of a screw 81 employed in connecting a plate 82 to the arm 75 to which plate the flexible tongue 74 is attached as shown in FIG. 8.

The free end of the spool B is here shown in FIG. 7 as equipped with a rest R against which the arm of the hand employed by the angler in holding the pole or rod G may be seated to stabilize the reel A during fishing operations. The rest R embodies a cap 83 overlying the outer side of the end flange 49 of the spool B and projecting therefrom; the cap being fixed on an end of a shaft 84 extending through and fixedly clamped on a cylindrical disk 85 by a screw 86 on the other end of the shaft 84, the head of which overlies the adjacent side of the disks and clamps its other side against a shoulder on the shaft 84.

The disk 85 is revolubly mounted in the outer end of the hub 44 of the spool B and is removably held in place by means of a split spring ring 87 carried by the disk 85 and tensioned to spring outwardly into a shallow channel 88 on the interior of the hub 44. By the recited construction the cap 83 is revoluble on the disk 85 which latter may be readily detached from the spool by exerting sufficient outward pull on the cap to free the spring 87 from engagement with the hub 44, thereby giving access to the adjusting screw 41 interiorly of the hub. The cap 83 also serves as a guard to protect the interior of the spool from being fouled with dirt particles as when resting the detached reel on the ground or other contaminating surface.

Interposed between the disk 85 and the head of the screw 41 is a helical spring 89 which exerts a thrust on the coupling M to oppose retraction thereof when feeding the threads 38 on the coupling into engagement with the threads 38' in the sleeve 31.

While various elements in the ensemble of the structure above set forth are old in the art of fishing reels, certain recited features of the construction constitute important improvements in the art in facilitating control of the free wheeling operation of the spool, particularly where transition is being made between the free line condition, wherein the spool is usually stationary and extended longitudinally of the rod with the line unwinding off the end of the spool, to the free spool condition transversely of the rod wherein the spool is revolved by unwinding of the line therefrom under the pull of a fish, and where minimum resistance to the unwinding of the line from the spool is desired, particularly when a fish is running with the mouthed baited hook and not yet hooked. This feature resides in part in the adjustment afforded by the screw 41 whereby the end thrust between the flanges n and k may be regulated by shifting the sleeve 31 lengthwise relative to the spindle to thereby attain the proper sliding fit or clearance between the flange n and k and insure against binding of the sleeve 31 on the spindle C.

In the operation of the invention, assuming the reel to be disposed with the spool in the free line position and held stationary by the brake P, and the clutch K in its disengaged position, in order to hook a fish the running with the mouthed baited hook, the reel housing D is first swung on its pivotal mounting J from the free line position of the spool B shown in FIGS. 4, 5 and 6 to the free spool and winding position shown in FIGS. 1, 2 and 3, as set forth in my United States Patent Number 3,053,469 above referred to. Coincident with this being done the brakes P and L are released and the clutch control lever 54 is actuated to advance the toothed ring p of the clutch K as before described, to thereby move the teeth a' thereon in position to be engaged with the slots b' in the flange o on the spool carrying sleeve 31 which sleeve will then be freely revolving under unwinding rotation of the spool by the pull on the line by the running fish. In event the teeth a' are disposed directly opposite the slots b' on initial advance of the clutch ring *p*, the teeth *a'* will be immediately engaged in the slots *b'* under the urge of the urge of the springs 69 acting through the bar 65 on the clutch ring *p* to advance the latter. In event the teeth *a'* are not positioned to directly enter the slots *b'* their outer ends will abut the advancing inclined end faces 50 of the flange *o* under pressure of the springs 69 and will thus be directed into the slots *b'* at one side thereof at points inset from the outer ends of the slots so that the other sides of the slots will engage the teeth and thereby insure against the teeth being jumped or skipped by the slots particularly where the spool is rotating at high speed. On engagement of the teeth *a'* in the slots *b'* being effected the then free wheeling spool will effect rotation of the clutch ring *p* together with the gear wheels 32 and 33 which then rotate freely with little resistance. At this point of transition the angler may bring the friction clutch L into action to retard rotation of the spool to prevent excessive unwinding of the line with resultant slack, or to stop rotation of the spool, or effect reverse rotation thereof to wind the line thereon, by operation of the star-wheel 37; the star-wheel being turned to advance it on the threaded shaft 34 and thereby crowd the friction disks of the clutch L into frictional engagement in the usual manner and to such extent as occasion may require. By preventing excessive slack in the unwinding line at the moment of transfer from free line to free spool conditions, and minimizing sudden resistance to unwinding of the line as may occur in taking up such slack, the fisherman is afforded better timing and much greater control in setting the hook mouthed by a running fish than is possible with the ordinary free line fishing reel. Manifestly setting of the hook is accomplished by manipulating the star wheel 17 to place the friction clutch L into an engaged position so as to either stop or retard the unwinding rotation of the spool, and also condition the reel for rewinding the line on the spool B by rotation of the hand crank 36.

Stopping or materially retarding rotation of the spool B imposes the sudden resistance to unwinding of the line from the spool necessary to plant the hook into engagement with a fish running with the baited hook loosely held in its mouth, which operation by the recited construction and mode of control can at least be attempted at the will of the angler. On the catch being made the line is wound on the reel by rotation of the hand crank 36 which turns the spool B in its rewinding direction limited by the pawl *z* and ratchet wheel *y* in the usual manner.

While the friction clutch L functions generally in the usual manner in making or breaking driving connection between the hand crank 36 and the spool driving mechanism and also in imposing resistance to unwinding of the line from the spool B, a feature of the invention resides in mounting the spool B in an elevated position relative to its supporting base E whereby the friction clutch L is of considerably larger diameter than ordinarily constructed, thereby providing greatly increased braking action in the friction clutch.

Initially assembling the spool B on the reel A involves insertion of the lug 53 carried by the spool into one of the slots *b'* in the clutch ring *p* while the spool is being co-incidently rotated and advanced on the threads 38–38', which necessitates accurate positioning of the lug 53 in circumferential relation to the spool in order to time the moment of its advance into the slot *b'* to its seated position therein. This positioning of the lug 53 is a matter of "trial and error" but is accomplished by reason of the lug 53 being mounted on the ring 52 which is demountably supported on the hub 51 so that its position circumferentially may be varied by removing and replacing it, until it is determined by trial, if need be, that the lug 53 will enter the slot *b'* when the coupling M is screwed to a seated position in the sleeve 31 by rotating the spool B. When this positioning of the lug 13 is once determined no further adjustment will be necessary since the ring 52 will be securely held in its mounting against accidental displacement by its frictional engagement with the hub 51.

When the lug 53 is seated in a slot *b'* it serves to prevent continued rotation of the spool B on the sleeve counter-clockwise such as to cause the spool to be tightened against the flange *o* under the wedge action of the threads 38–38', thereby insuring ready detachment of the spool.

Figure 22:
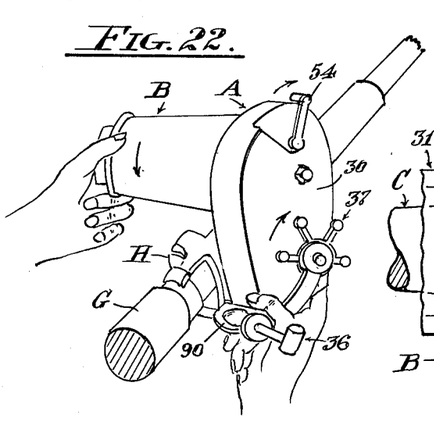
FIG. 22 is a perspective view illustrating the manual operations employed in effecting detachment of the line spool from the reel.

When it is desired to remove the spool, as in effecting an interchange, the modus operandi depicted in FIG. 22 is carried out by the following succession of steps:

(1) The spool B is first disposed in its rewinding position transverse of the rod G;

(2) The clutch control lever 54 is disposed in the clutch engaged position;

(3) The star-wheel 37 is turned to engage the friction clutch L;

(4) The crank 36 is held against movement;

(5) The spool B is grasped and turned clockwise, thereby unscrewing the threads 38–38' as indicated in FIG. 24.

Figures 17, 18, 19, 20, 21:
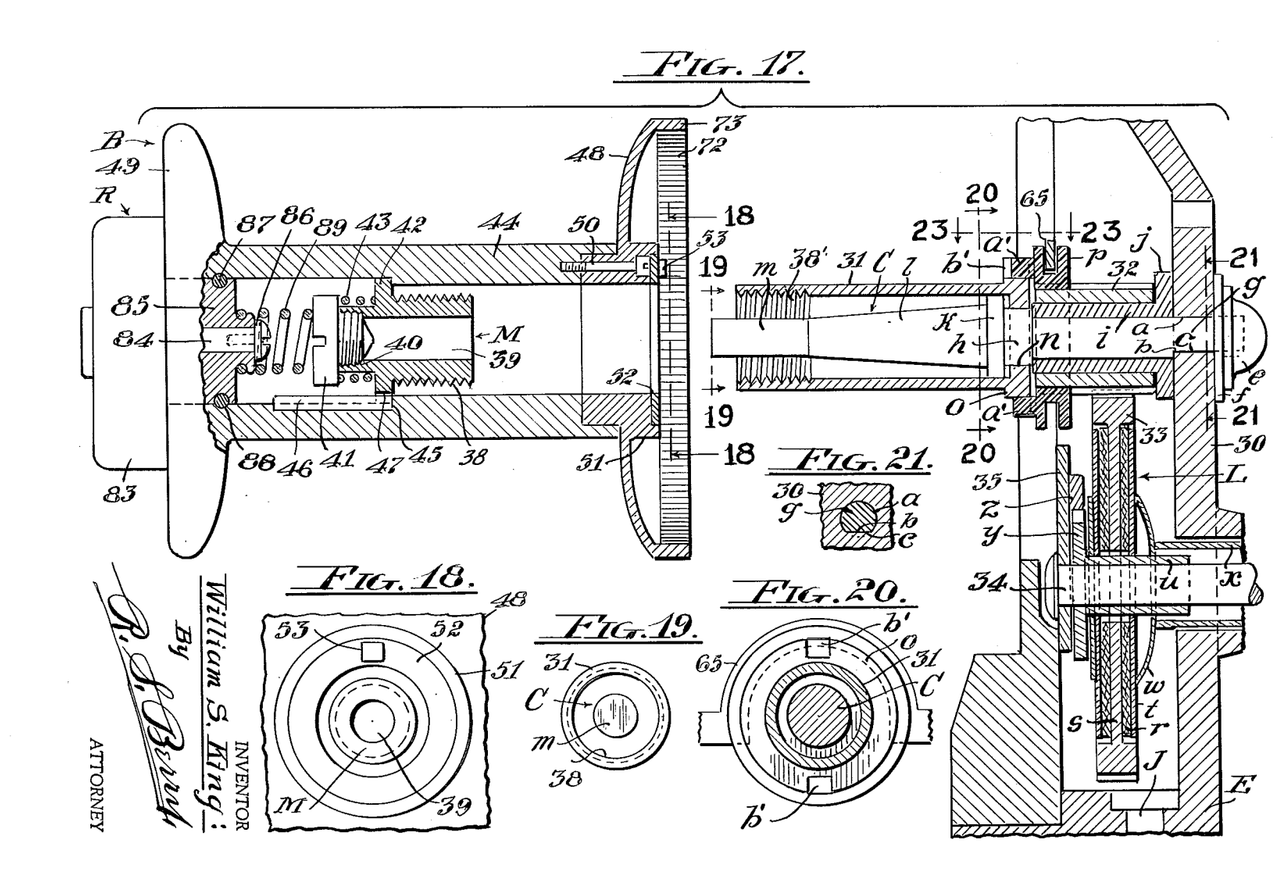
FIG. 17 is an enlarged view in section and elevation with portions broken away showing the line spool as detached from the reel and showing the positive clutch and the friction clutch elements in their engaged position essential to the mounting and replacement of the line spool.
FIG. 18 is a detail in elevation as seen on the line 18—18 of FIG. 17 showing the manner of equipping the spool with a keeper lug for inter-engaging the spool and reel.
FIG. 19 is a view in end elevation taken on the line 19—19 of FIG. 17.
FIG. 20 is a view in section and elevation as seen on the line 20—20 of FIG. 17.
FIG. 21 is a detail cross section taken on the line 21—21 of FIG. 17.

The spool may then be removed clear of the reel as shown in FIG. 17.

Combining the features of a free line reel and a free spool reel as herein set forth brings into free line fishing operations the advantages of the braking or drag action incident to free spool fishing operations, which gives to the angler a new and highly advantageous development in free line fishing.

It will now be seen that by the provisions of the construction of the spool mounting particularly shown in FIGS. 7, 17, 24 and the mode of assemblage set forth, quick interchange of spools may be readily effected where an angler has a kit embodying a plurality of spools fitted with lines of various characteristics adapted for various conditions, without the use of tools.

When the reel is being employed in free line fishing, the line in unwinding over the outer end flange 49 of the spool normally tends to rotate the spool and possibly at an accelerated rate such as to develop unwanted slack in the line particularly when casting. This objectionable action is obviated by utilizing the braking action of the retarder P in imposing a light drag on the otherwise freely revoluble spool. This is accomplished by maintaining the retarder P in its operating condition while the spool is in its free line position, the spring tongue 74 then engaging the serrations 72 and thereby offering resistance to rotation of the spool. By arranging the retarder P on the reel at the front or inner end of the spool, the controlling rocker arm 75 is located within easy reach of the hand of the operator poised for manipulation of the clutch lever 54, the line rewinding crank 36 and the star wheel 37 controlling the friction clutch L. Such controlling elements are out of service when the spool B is in its free line position wherein the clutch K is maintained in its then essential open or disengaged condition, as shown in FIG. 3, in order to immediately effect conversion of the spool from its free line to its free spool condition by merely turning the reel housing A on its pivotal mounting J as set forth in Patent Number 3,053,469 aforesaid.

By employment of the reel mount set forth in said patent, the reel is releasably locked on the support F when disposed with the spool B overlying the rod G as shown in FIGS. 1, 2, 3, by a spring pressed keeper or locking bar T which underlies the support F and extends astride thereof, as shown in FIG. 2 and projects on opposite sides of the base E so as to hold the reel against turning on the pivot pin J. The locking bar T is equipped with a thumb-rest 90 by means of which it may be depressed to release the reel whereupon the latter may be turned a quarter revolution, on the crank 36 being elevated to extend above the rod G, as shown in FIG. 2.

On thus turning the reel whereby the spool B will be positioned longitudinally of the rod as shown in FIGS. 4–5–6, the base E of the reel will seat on the upstanding portions of the locking bar T as shown in FIGS. 5–6 and resisted against freely turning by the spring 91 shown in FIG. 7, which spring exerts a downward thrust on the pivot pin J. When the reel is thus positioned, the thumb-rest 90 is released. When it is desired to restore the reel to its initial position such is accomplished by merely grasping the reel housing and turning it on the pivot pin J from the position shown in FIG. 4 to that shown in FIG. 1, which may be easily effected while a pull is exerted on the line, since the spool B will then be free wheeling and will rotate under the pull on the line which accordingly will offer no resistance to advance of the spool B to its rewinding position.

While I have shown and described a specific embodiment of the invention, it is not limited to the exact construction set forth but is subject to various changes and modifications as come within the meaning and scope of the appended claims.

I claim:

1. In a fishing reel, a fixed spindle, a revoluble sleeve on said spindle, a clutch on said spindle adapted to positively engage said sleeve, a line spool encompassing said sleeve having screw threaded connection with one end thereof, a flange on the other end of said sleeve having a slot adapted to be engaged by said clutch, a lug on an end of said spool engageable in said slot to thereby hold said spool against rotation relative to said sleeve, and means for driving said clutch to rotate said spool through said sleeve.

2. In a fishing reel, a revoluble sleeve, a mounting therefor, a peripheral flange on one end of said sleeve having a slot, a line spool encompassing said sleeve and having a screw threaded connection therewith, one end of said spool being presented to said flange and embodying a recess surrounded by an annular side wall, a ring seated in said recess having a margin frictionally engaged with said annular side wall, and a lug on said ring engageable in said slot to thereby hold said spool against rotation relative to said sleeve, said lug being moveable in and out of engagement with said slot by advancing and retracting said spool longitudinally on said sleeve by means of said screw threaded connection, said ring being circumferentially adjustable in said recess to position said lug for engagement with said slot when said spool is advanced relative to said sleeve.

References Cited by the Examiner

UNITED STATES PATENTS

| | | | |
|---|---|---|---|
| 860,162 | 7/1907 | Townsend | 151—34 |
| 1,099,230 | 6/1914 | Young | 192—108 |
| 1,180,561 | 4/1916 | Bateman | 121—34 |
| 1,940,593 | 12/1933 | Henze | 242—84.54 |
| 1,984,244 | 12/1934 | Wilson | 151—34 |
| 2,120,190 | 6/1938 | Rickards, et al. | 242—84.2 |
| 2,129,386 | 9/1938 | Schafer | 242—84.44 |
| 2,198,257 | 4/1940 | McMahon | 242—84.54 |
| 2,518,903 | 8/1950 | King | 242—84.45 X |
| 2,550,271 | 4/1951 | Kagel. | |
| 2,553,200 | 5/1951 | Mandolf et al. | 242—84.46 |
| 2,604,272 | 7/1952 | Olsen | 242—84.2 |
| 2,613,046 | 10/1952 | Redding | 242—84.2 |
| 2,652,211 | 9/1953 | Hanse | 242—84.54 X |
| 2,724,563 | 11/1955 | Shakespeare et al. | 242—84.21 |
| 2,731,214 | 1/1956 | Bogar | 242—84.2 |
| 2,755,037 | 7/1956 | Sarah | 242—84.21 X |
| 2,755,900 | 7/1956 | Seyfield | 192—108 X |
| 2,796,224 | 6/1957 | Jefferson | 242—84.2 |
| 2,896,876 | 7/1959 | Bogar | 242—84.2 X |
| 2,929,578 | 3/1960 | Hull | 242—84.2 |
| 3,053,469 | 9/1962 | King | 242—84.2 |

FOREIGN PATENTS 470,937  4/1952  Italy.

MERVIN STEIN, *Primary Examiner.*